United States Patent
Lee et al.

(10) Patent No.: US 7,777,450 B2
(45) Date of Patent: Aug. 17, 2010

(54) PUSH-UP TYPE PORTABLE CHARGING CRADLE INCLUDING STEREO SOUND SYSTEM

(75) Inventors: Kyung-Jin Lee, Seoul (KR); Joon-Suh Kim, Anyang-si (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 11/858,027

(22) Filed: Sep. 19, 2007

(65) Prior Publication Data

US 2008/0067977 A1 Mar. 20, 2008

(30) Foreign Application Priority Data

Sep. 19, 2006 (KR) .................... 10-2006-0090629

(51) Int. Cl.
 *H02J 7/00* (2006.01)
(52) U.S. Cl. .................. 320/115; 455/573; 381/334
(58) Field of Classification Search .............. 320/115, 320/114; 455/575.1, 575.4, 573; 379/446, 379/454, 455; 381/334
See application file for complete search history.

(56) References Cited

U.S. PATENT DOCUMENTS

| 6,865,406 | B2 | 3/2005 | Park |
| 7,230,822 | B2 * | 6/2007 | Langberg et al. ........ 361/679.23 |
| 7,280,656 | B2 * | 10/2007 | Peiker .................... 379/446 |
| 2004/0206872 | A1 * | 10/2004 | Peiker .................... 248/310 |
| 2006/0105803 | A1 * | 5/2006 | Son ...................... 455/550.1 |

FOREIGN PATENT DOCUMENTS

| KR | 1020040048512 | 6/2004 |
| KR | 1020050067733 | 7/2005 |
| KR | 1020060054821 | 5/2006 |
| KR | 10-0677394 | 1/2007 |

OTHER PUBLICATIONS

Machine Translation for KR1020040048512.*

* cited by examiner

*Primary Examiner*—Edward Tso
*Assistant Examiner*—Ramy Ramadan
(74) *Attorney, Agent, or Firm*—The Farrell Law Firm, LLP

(57) ABSTRACT

A push-up type portable charging cradle having a stereo sound system is disclosed. The portable charging cradle includes a cradle body and a push-up type cradle rotatably mounted in the cradle body so that the push-up type cradle protrudes from or retracts to the top surface of the cradle body according to whether the push-up type cradle is pushed or not.

7 Claims, 3 Drawing Sheets

PUSH-UP TYPE PORTABLE CHARGING CRADLE INCLUDING STEREO SOUND SYSTEM

PRIORITY

This application claims the benefit under 35 U.S.C. §119(a) of a Korean Patent Application filed in the Korean Intellectual Property Office on Sep. 19, 2006 and assigned Serial No. 2006-90629, the entire disclosure of which is hereby incorporated by reference.

BACKGROUND OF THE INVENTION

1. Field of the Invention

The present invention generally relates to a mobile communication terminal such as a Digital Multimedia Broadcasting (DMB) phone, a game phone, a chatting phone, a camera phone, an MP3 phone, a cellular phone, a Personal Communication Service (PCS) phone, a Personal Digital Assistant (PDA), and a Hand Held Phone (HHP), and in particular, to a portable charging cradle that allows a user to conveniently charge/cradle a mobile communication terminal.

2. Description of the Related Art

In general, the term "portable terminal" refers to an electronic apparatus carried with a user to perform wireless communication. The wireless communication may be voice communication, message transmission, file transmission, video communication, or a camera function. Additionally, the portable communication terminal serves as a personal agent by performing phone number management and personal schedule management.

In terms of portability, such portable terminals tend to be compact, slim, and light, and have excellent gripping properties and also include multimedia availability for a wide variety of functions. Future portable terminals are expected to incorporate greater multi-functionality and multi-purpose utilization. Future portable terminals will also be more compact and light and will be modified to be suitable for various multimedia environments or Internet environments.

Conventional portable communication terminals may be classified into various types according to their appearance in consideration of portability and convenience in use, such as bar-type communication terminals and folder-type communication terminals. The bar-type communication terminal has a single housing shaped like a bar in which data input/output devices, an antenna device, and transmission/reception devices are mounted. The folder-type communication terminal has a folder coupled to a single bar-shaped housing by a hinge device in such a manner that the folder can be rotated in order to be folded towards and unfolded away from the housing. For example, in a folder-type portable communication terminal, a folder is rotatably coupled to a main body by a hinge device, keys are disposed in the main body, and a display unit is disposed in the folder in the folder-type mobile communication terminal, contributing to miniaturization and portability. A folder-type portable communication terminal is disclosed in U.S. Pat. No. 6,865,406, which is commonly assigned to the assignee of the present application. In the disclosed folder-type portable communication terminal, a camera lens housing is mounted in a hinge device.

Additionally, the portable communication terminals may be further classified as swing-type communication terminals and sliding-type communication terminals based upon the way of opening and closing the communication terminals. In the swing-type communication terminals, two housings are coupled to each other to allow one housing to rotate relative to the other while facing each other. In the sliding-type communication terminal, two housings are coupled to each other to allow one housing to slide along a longitudinal direction to open or close the sliding-type communication terminal.

These various types of mobile communication terminals are supplied with electrical power from a rechargeable battery which is capable of being charged in a separate charging cradle. A general charging cradle has a slot for supporting a mobile communication terminal in a charging state and a battery pack is charged while being settled in the slot.

However, a charging cradle used in a general mobile communication terminal is inconvenient to carry. In other words, the charging cradle has a larger width and length than the mobile communication terminal and is bulky, making it inconvenient for the user to carry the charging cradle.

Moreover, the user experiences inconvenience in being required to check to see that the mobile communication terminal is stably settled in the slot of the charging cradle.

Furthermore, the charging cradle provides only a charging function when the mobile communication terminal is settled in the charging cradle.

SUMMARY OF THE INVENTION

An aspect of the present invention is to address at least the above problems and/or disadvantages and to provide at least the advantages described below. Accordingly, an aspect of the present invention is to provide a portable charging cradle having a push-up type cradle that rises upwardly with a single push, thereby allowing a user to conveniently cradle a mobile communication terminal.

Another aspect of the present invention is to provide a portable charging cradle that is convenient to carry due to its small size.

Another aspect of the present invention is to provide a portable charging cradle capable of charging/cradling a mobile communication terminal in at least one of a perpendicular direction and an inclined direction, irrespective of an action of a push-up type cradle.

Another aspect of the present invention is to provide a portable charging cradle having a stereo sound system for radiating stereo sound when a mobile communication terminal is charged/cradled in the portable charging cradle.

Another aspect of the present invention is to provide a portable charging cradle having a push-up type cradle that is hidden in a cradle body when not used, thus making the cradle convenient to carry.

According to one aspect of the present invention, there is provided a portable charging cradle for a mobile communication terminal. The portable charging cradle includes a cradle body and a push-up type cradle which is mounted in the cradle body in such a way to retract or protrude from the top surface of the cradle body according to whether it is pushed or not.

According to another aspect of the present invention, there is provided a portable charging cradle for a mobile communication terminal. The portable charging cradle includes a cradle body, a push-up type cradle which provides a slot whose top end is opened and which is mounted in the cradle body in such a way to retract or protrude from the top surface of the cradle body according to whether it is pushed, and a stereo sound system which is mounted on the top surface of the cradle body in order to radiate stereo sound perpendicularly and upwardly.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

Figure 1:
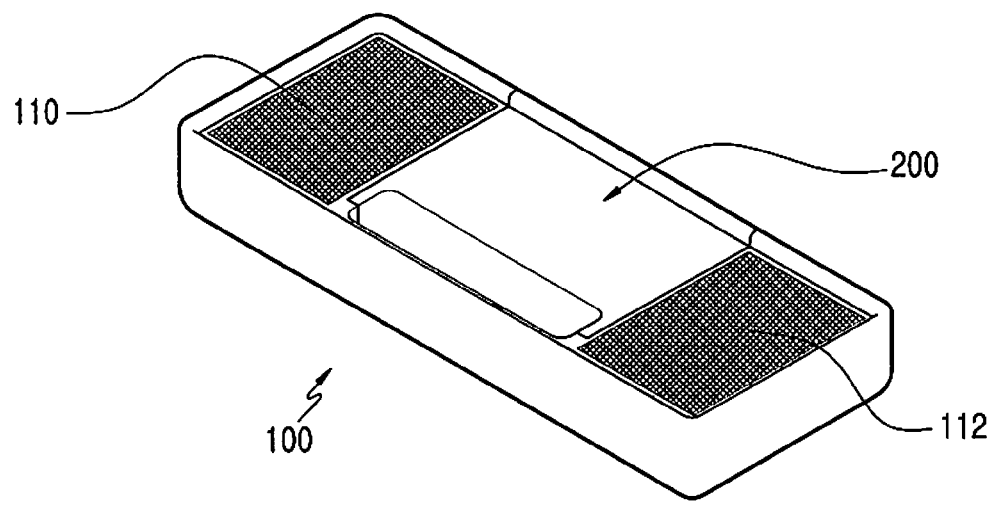
FIG. 1 is a perspective view illustrating a portable charging cradle according to the present invention.

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Throughout the drawings, the same drawing reference numerals will be understood to refer to the same elements, features and structures.

As illustrated in FIGS. 1 through 4, a portable charging cradle according to the present invention includes a push-up type cradle 200 that retracts or protrudes according to whether it is pushed. Moreover, when a mobile communication terminal is charged/cradled in the portable charging cradle according to the present invention, the portable charging cradle receives sound signals output from the terminal and provides stereo sound to a user in order to facilitate watching various moving pictures such as in a Digital Multimedia Broadcasting (DMB) mode on the terminal.

Figure 2:
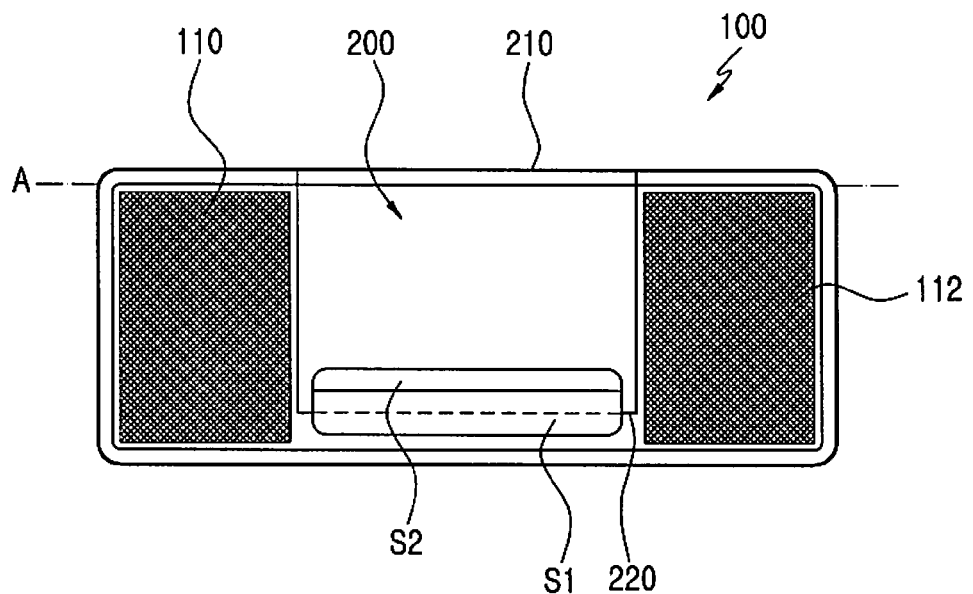
FIG. 2 is a plan view of the cradle in FIG. 1.

The portable charging cradle according to the present invention includes a cradle body 100 and a push-up type cradle 200 that is mounted in the cradle body 100 such that the push-up type cradle 200 retracts within the cradle body 100 or protrude from the cradle body 100 according to whether it is pushed by the user. The cradle body 100 may take the form of a box. The push-up type cradle 200 is mounted in a central portion of the top surface of the cradle body 100 in such a way to rotate with respect to a rotation axis A (FIG. 2).

The cradle body 100 and the push-up type cradle 200 include a slot as an accommodating space for cradling the mobile communication terminal. The slot may include a first slot S1 in the cradle body 100 and a second slot S2 in the push-up type cradle 200. The second slot S2 of the push-up type cradle 200 is hidden in the cradle body 100 or exposed according to whether the push-up type cradle 200 is pushed. The push-up type cradle 200 is hidden in the cradle body 100 in FIG. 2 and protrudes from the cradle body 100 in FIG. 3.

The first slot S1 is formed in the rear of the cradle body 100, and the second slot S2 is formed in the rear of the push-up type cradle 100 in such a way to communicate with the first slot S1.

The first slot S1 may be positioned further rear than the second slot S2. The first slot S1 and the second slot S2 can cradle the mobile communication terminal irrespective of rotation of the push-up type cradle 200. In particular, the first slot S1 and the second slot S2 may cradle the mobile communication terminal in at least one of a perpendicular direction and an inclined direction of the mobile communication terminal. When the push-up type cradle 200 rotates from a hidden (i.e. retracted) position to an exposed (i.e. protruded) position a predetermined angle from the cradle body 100, the mobile communication terminal is cradled in the inclined direction. When the push-up type cradle 200 entirely retracts within the cradle body 100, the mobile communication terminal is cradled in the perpendicular direction. The first slot S1 and the second slot S2 are structured such that their top ends are opened and their bottom ends are closed. A charging terminal (not shown) is provided in the bottom end of the second slot S2.

As illustrated in FIG. 2, the rotation axis A for the push-up type cradle 200 extends in the lengthwise direction of the cradle body 100 along the front portion of the cradle body 100.

Figure 3:
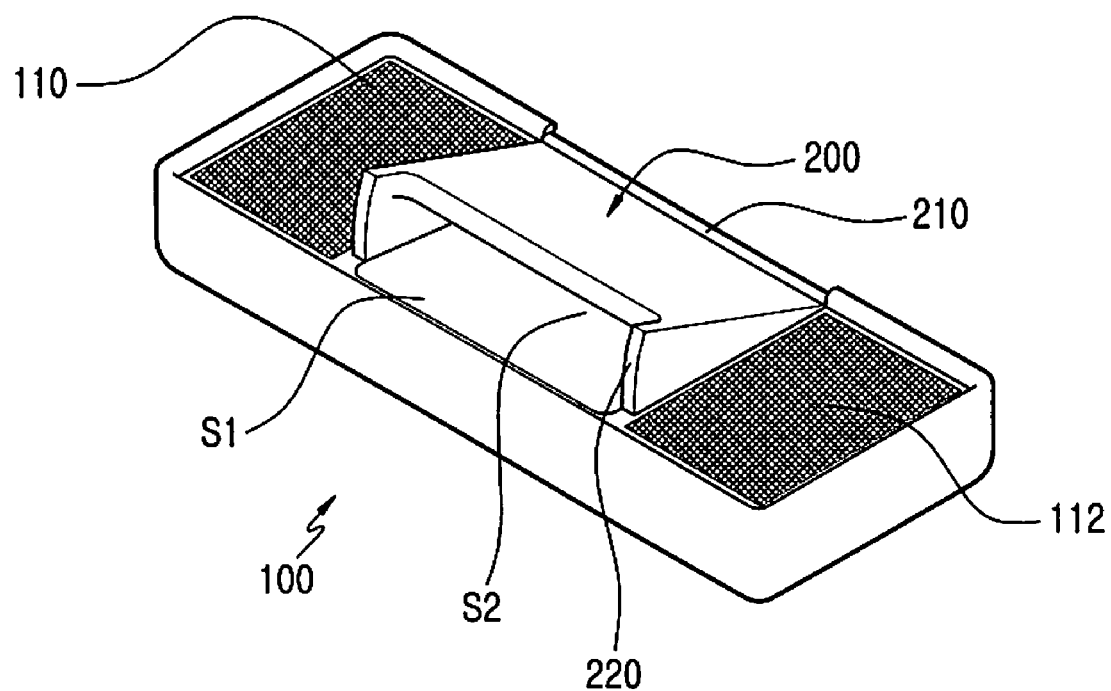
FIG. 3 is a perspective view illustrating a pushed-up portable charging cradle according to the present invention.
Figure 4:
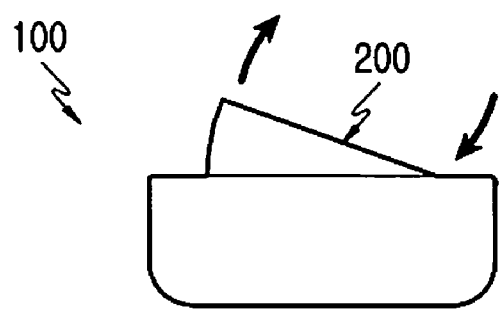
FIG. 4 is a side view of the cradle in FIG. 3.

As illustrated in FIGS. 3 and 4, since the rotation axis A is eccentric in the cradle body 100, the push-up type cradle 200 can be divided into a portion descending downwardly and a portion protruding upwardly during rotation to protrude. In other words, when the push-up type cradle 200 rotates, its front end portion 210 is pushed and descends and its rear end portion 220 protrudes upwardly by rotating the largest rotation distance in the push-up type cradle 200. The push-up type cradle 200 constitutes a box shape with the cradle body 100 when retracting within the cradle body 100 and protrudes more in its rear end portion 220 when protruding from the cradle body 100.

As illustrated in FIGS. 1 through 3, the cradle body 100 includes a stereo sound system for radiating stereo sound. The stereo sound system may include speakers 110 and 120 mounted on the top surface of the cradle body 100. In particular, with the stereo sound system mounted on the top surface of the cradle body 100, the quality of using the cradled mobile communication terminal can be improved in a mode associated with watching various moving pictures.

Figure 5:
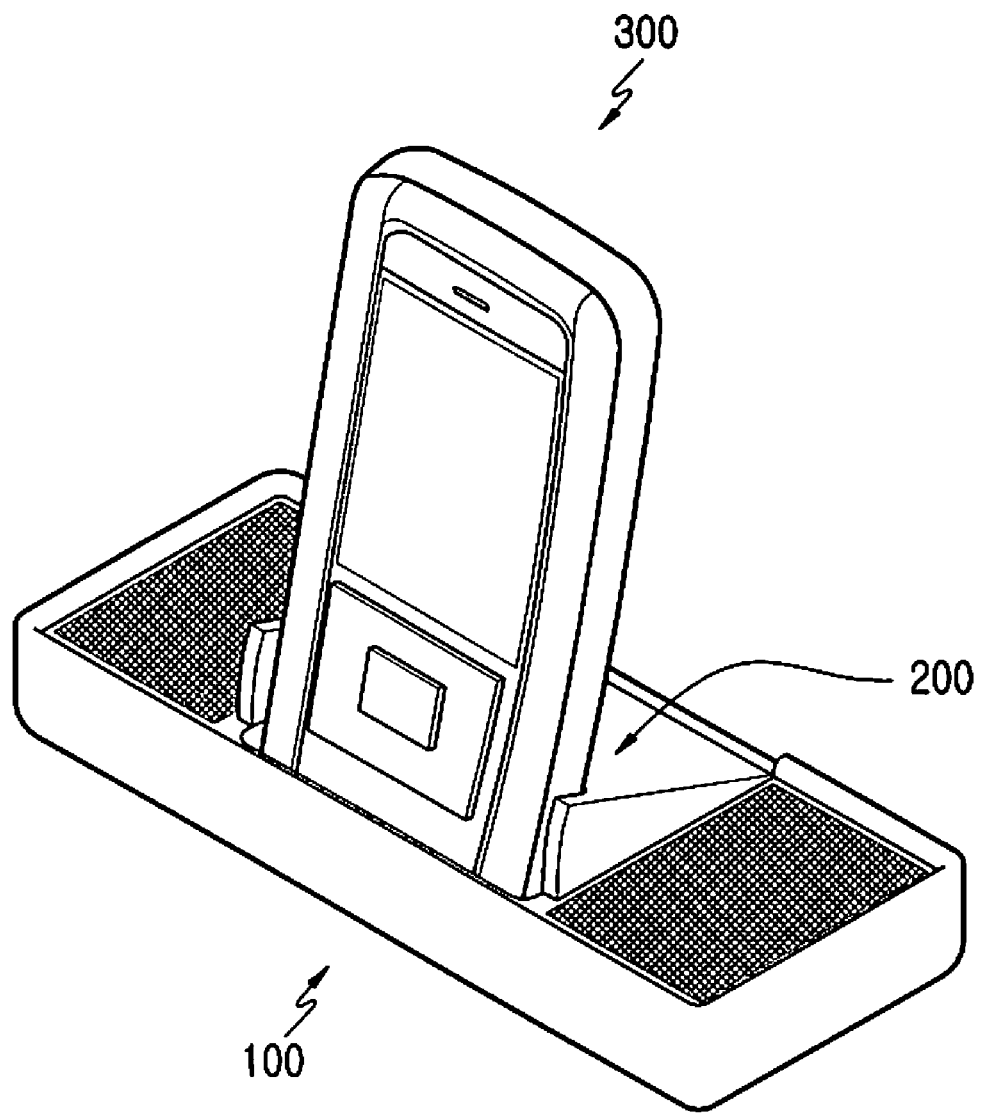
FIG. 5 is a perspective view illustrating a state in which a mobile communication terminal is charged/cradled in a push-up type portable charging cradle according to the present invention.

In FIG. 5, a mobile communication terminal 300 is inclinedly cradled in the push-up type cradle 200 that protrudes from the cradle body 100.

As described above, the portable charging cradle according to the present invention has a small size and includes the push-up type cradle that is hidden in the cradle body in the carrying mode, thus making the cradle convenient to carry. Moreover, the push-up type cradle makes it easy to cradle the mobile communication terminal and allows the user to cradle the mobile communication terminal in at least one of a perpendicular direction and an inclined direction. Furthermore, with the stereo sound system mounted in the cradle body, the quality of watching moving pictures by using the cradled mobile communication terminal can be improved.

While the invention has been shown and described with reference to an exemplary embodiment thereof, it will be understood by those skilled in the art that various changes in form and details may be made therein without departing from the spirit and scope of the invention.

What is claimed is:

1. A portable charging cradle for a mobile communication terminal, the portable charging cradle comprising:
   a cradle body; and
   a push-up type cradle rotatably mounted in the cradle body so that the push-up type cradle protrudes from and retracts to a top surface of the cradle body according to whether the push-up type cradle is pushed to rotate about a rotation axis, wherein when the push-up type cradle rotates, a front portion of the push-up type cradle is pushed and descends, and a rear portion of the push-up type cradle protrudes upwardly in a largest rotation distance of the push-up type cradle, wherein the cradle body and the push-up type cradle include a cradle slot for cradling the mobile communication terminal in at least one of a perpendicular direction and an inclined direction, the cradle slot includes a first slot formed in a rear portion of the cradle body and a second slot communicating with the first slot and formed in a rear portion of the push-up type cradle, and the mobile communication terminal is cradled in the first slot and second slot.

2. The portable charging cradle of claim 1, wherein the cradle slot is exposed or hidden in the cradle body according to whether the push-up type cradle is pushed.

3. The portable charging cradle of claim 1, wherein the rotation axis extends in a lengthwise direction of the cradle body along a front portion of the cradle body.

4. The portable charging cradle of claim 1, wherein in retraction the push-up type cradle constitutes a box shape with the cradle body, and in protrusion a rear portion of the push-up type cradle protrudes.

5. A portable charging cradle for a mobile communication terminal, the portable charging cradle comprising:

a cradle body;

a push-up type cradle rotatably mounted in the cradle body and providing a slot opened at the top; and a stereo sound system mounted on a top surface of the cradle body, wherein the push-up type cradle protrudes from and retracts to the top surface according to whether the push-up type cradle is pushed, wherein when the push-up type cradle rotates, a front portion of the push-up type cradle is pushed and descends, and a rear portion of the push-up type cradle protrudes upwardly in a largest rotation distance of the push-up type cradle, wherein the cradle body and the push-up type cradle include a cradle slot for cradling the mobile communication terminal in at least one of a perpendicular direction and an inclined direction, the cradle slot includes a first slot formed in a rear portion of the cradle body and a second slot communicating with the first slot and formed in a rear portion of the push-up type cradle, and the mobile communication terminal is cradled in the first slot and second slot.

6. The portable charging cradle of claim 5, wherein the stereo sound system includes speakers that are positioned symmetrically with respect to the push-up type cradle.

7. The portable charging cradle of claim 5, wherein the push-up type cradle cradles the mobile communication terminal in the slot irrespective of rotation of the push-up type cradle.

* * * * *